US010239465B2

(12) United States Patent
Kovarik (10) Patent No.: US 10,239,465 B2
(45) Date of Patent: Mar. 26, 2019

(54) METHOD AND SYSTEM FOR CARRYING A BICYCLE ON A VEHICLE

(71) Applicant: Joseph E. Kovarik, Englewood, CO (US)

(72) Inventor: Joseph E. Kovarik, Englewood, CO (US)

(*) Notice: Subject to any disclaimer, the term of this patent is extended or adjusted under 35 U.S.C. 154(b) by 110 days.

(21) Appl. No.: 15/444,619

(22) Filed: Feb. 28, 2017

(65) Prior Publication Data

US 2017/0253189 A1     Sep. 7, 2017

Related U.S. Application Data

(60) Provisional application No. 62/303,675, filed on Mar. 4, 2016.

(51) Int. Cl.
*B60R 9/10*     (2006.01)
*B60R 9/048*    (2006.01)

(52) U.S. Cl.
CPC ............. *B60R 9/10* (2013.01); *B60R 9/048* (2013.01)

(58) Field of Classification Search
CPC .... B60R 9/10; B60R 9/06; B60R 9/04; B60R 9/048; Y10S 224/924; B62H 3/08
See application file for complete search history.

(56) References Cited

U.S. PATENT DOCUMENTS

| | | | | |
|---|---|---|---|---|
| 3,865,245 A * | 2/1975 | Lieb | ............... | B62H 3/10 |
| | | | | 211/5 |
| 4,126,228 A * | 11/1978 | Bala | ............... | B62H 3/08 |
| | | | | 211/22 |
| 4,524,893 A | 6/1985 | Cole | | |
| 5,323,915 A * | 6/1994 | Fortune, Sr. | ............. | B62H 3/00 |
| | | | | 211/22 |
| 5,692,659 A | 12/1997 | Reevesh | | |
| 6,439,397 B1 * | 8/2002 | Reeves | ................ | B60R 9/048 |
| | | | | 211/17 |
| 6,601,712 B2 | 8/2003 | Dean et al. | | |
| 6,761,297 B1 | 7/2004 | Pedrini | | |
| 7,222,763 B2 | 5/2007 | Pedrini | | |
| 8,496,148 B2 | 7/2013 | Farney et al. | | |
| 8,961,172 B2 | 2/2015 | Dupray et al. | | |
| 9,499,223 B2 * | 11/2016 | Oviatt | .............. | B62H 3/02 |
| 10,059,276 B2 * | 8/2018 | Phillips | ................ | B60R 9/10 |
| 2011/0123942 A1 | 5/2011 | Rudman et al. | | |
| 2015/0026935 A1 | 1/2015 | Prescott | | |

\* cited by examiner

*Primary Examiner* — Adam Waggenspack
(74) *Attorney, Agent, or Firm* — Sheridan Ross P.C.

(57) ABSTRACT

A vehicle-mounted bicycle carrier allows a bicycle to be mounted to the carrier in a ride-ready fashion, without the need to remove one of the bicycle wheels, and permits the reversible securement of both wheels simultaneously by a simple single pivotal movement of a tire retention loop.

20 Claims, 6 Drawing Sheets

METHOD AND SYSTEM FOR CARRYING A BICYCLE ON A VEHICLE

RELATED APPLICATIONS

This application is a non-provisional application of U.S. Provisional Application Ser. No. 62/303,675 filed on Mar. 4, 2016. The entire disclosure of the prior application is considered to be part of the disclosure of the accompanying application and is hereby incorporated by reference.

FIELD OF THE INVENTION

The present invention is directed to a vehicle-mounted bicycle carrier, and more particularly to a bicycle carrier which allows the bicycle to be mounted to the carrier in a ride-ready fashion, without the need to remove one of the bicycle wheels, and which permits the reversible locking retention of both wheels by a simple pivoting movement of a tire retention loop.

BACKGROUND AND SUMMARY OF THE INVENTION

Various types of vehicle-mounted bicycle carriers are known that enable a bicycle to be transported on a vehicle. Fork mount bicycle carriers typically have a rear wheel support and require the user to disengage the front wheel of the bicycle using a conventional quick release mechanism associated with the hub of the bicycle wheel. While these types of bicycle carriers provide secure and stable engagement of the bicycle with the carrier, the requirement to remove the front wheel of the bicycle entails time and effort which is inconvenient to the bicycle user. Typical hitch-mounted carriers suspend the bicycle from the top tube of the bicycle frame. While these types of bicycle carriers function satisfactorily for many types of bicycles, many bicycle frames do not have a conventionally configured top tube, and are thus not well suited for use with this type of carrier. While a bicycle beam can be temporarily connected between the seat post and handle bar post to provide a member which can be engaged with this type of carrier in order to suspend the bicycle, this entails use of an additional piece of equipment which must be purchased and be kept at the ready whenever it is desired to transport the bicycle. Further, while this type of carrier allows the bicycle wheels to remain engaged with the bicycle, provisions must be made to minimize swinging or swaying of the bicycles during transport, by stabilizing the bicycles vertically above or below the point of engagement with the rack. Certain frame designs are not well suited for use with suspension-type carriers. A problem with gripping the frame is that the same fastener may not work adequately for certain frame geometries. Another problem is that some frame materials such as aluminum or carbon fiber may be susceptible to damage due to tight clamping forces.

Other types of bicycle carriers incorporate front and rear wheel trays that receive the front and rear wheels of the bicycle, in combination with a stabilizing member which engages a portion of the bicycle vertically above the wheel trays. Some designs provide such stability by engaging the pedal crank or one of the bicycle frame components, e.g. the down tube or seat tube. Prior art devices often employ types of binding devices that use straps and buckles to secure bike wheels to underlying support members so as to grip either or both the front and back tires.

There is a long-felt but unsolved need for a bicycle rack for a vehicle that provides a simple way for a bike owner to mount a ready-to-ride bike on his/her vehicle in a fashion such that one basic movement of a bike securing element is sufficient to retain the bike in a secure position on the vehicle. The ability to secure a bike to a vehicle without the need to address straps to engage one or more portions of the bike or its wheels has not previously been available. Nor has there been a system or method that permits a bike owner to place a bike in a stable pre-securement position on the top of a car and then make a single, easy movement of a pivoting member to simultaneously secure both tires of a bike in a fashion such that the bike is secured and ready for transport. Similarly, a method and system that allows for the removal of a bike that is secured to the roof of a car by merely pivoting one movable bike securing member, thereby releasing the bike from the engagement mechanisms of the bike carrier, thus permitting the owner to then simply lift and remove the bike from the car's roof, has heretofore not been available.

SUMMARY OF THE INVENTION

It is an object of the present invention to provide a ride-ready bicycle carrier capable of quickly and easily mounting various types and sizes of bicycles. It is a further object of the invention to provide such a bicycle carrier which is capable of supporting the bicycle in a hands-free manner when the bicycle is initially engaged with the carrier. A still further object of the invention is to provide such a bicycle carrier which incorporates a stabilizing member configured and arranged to provide positive engagement of the bicycle wheel with the carrier, preferably employing a rotating tire encircling clamp that replaces the need for conventional straps to achieve the function of securing tires to a carrier for the bike. Yet another object of the invention is to provide such a bicycle carrier which engages one of the bicycle wheels in a similar engagement configuration for all sizes of bicycle wheels. A still further object of the invention is to provide for quick and easy mounting of the bicycle to the carrier while providing positive engagement of the bicycle with the carrier so as to prevent movement of the bicycle during transport.

In various aspects of the present invention, the bike mount engagement features include those that primarily grip and/or encircle and retain the tires/wheels of a bike and is believed advantageous because, unlike bike frame configurations, wheel dimensions tend to remain more standardized. Wheel/tire gripping bike mounts also avoid potentially damaging gripping forces on a bike frame.

Other designs engage an upper area of one of the bicycle tires so as to provide stability when the bicycle is mounted to the carrier. Examples of designs of this type are shown in Reeves U.S. Pat. No. 5,692,659 and Cole U.S. Pat. No. 4,524,893, both incorporated herein by this reference. The '893 patent illustrates a carrier of this type with a pivotable stanchion which is pivoted over the bicycle wheel when both wheels are received within a tray. The '659 patent illustrates a carrier with a wheel-receiving well for receiving one of the bicycle wheels, and a frame which supports the other of the bicycle wheels. A wheel-engaging arm is pivotably mounted to the frame. The arm includes an extendible outer portion having a wheel-engaging hook at its outer end, and which is movable inwardly and outwardly relative to an inner portion pivotably interconnected with the frame. A spring biases the outer portion of the arm inwardly, to force the outer hook portion into engagement with the wheel so as to stabilize the bicycle.

The present invention addresses the desire to provide a bike rack that will work with a multitude of crossbar configurations, especially in view of current vehicles coming equipped with factory crossbars. Roof racks have many advantages over other types of carry systems. In many cases they provide the greatest capacity to handle multiple bikes for a given vehicle. Other embodiments of the present invention however, are directed to mounting of bikes on the rear of vehicles. One of skill in the art, with the teachings and guidance as provided herein, will understand and appreciate the various different ways that the galaxy clamp embodiments as described here can be adopted for use with such other designs. Thus, while the focus of the present description is to a roof mounted carrier for bikes, it should be understood that hitch or rear mounted carriers are also included within the scope of the present invention.

In one particular embodiment, the present invention is directed to a vehicle-mounted bicycle carrier that allows a bicycle to be mounted to the carrier in a ride-ready fashion, without the need to remove one of the bicycle wheels, and permits the reversible securement of both wheels simultaneously by a simple single pivotal movement of a tire retention arch/loop.

Getting bikes on and off of a vehicle, such as a car or SUV, with minimal effort and headache is one issue addressed by the present invention. The less hassle it is to load a bike quickly to a vehicle in a secure fashion, the more likely a bike rider will be to go for a ride. Thus, instead of prior art systems largely relying on straps to lock down the wheels of a bike on a carrier, some touting that such straps can purportedly be easily adjusted, the present invention far surpasses such straps in terms of immediately trapping a bike's tires/wheels in a fashion that does not require straps around the wheels at all. Because the present system and method facilitate the securement of a bike on a vehicle, particularly the roof of a vehicle, and does away with the need for straps around wheels, and thus avoids the costs and the hassle of such prior art strap systems, e.g. the need to thread straps into retaining devices, the present invention provides a far simpler and straightforward way to reversibly secure items to a moving vehicle, especially bicycles, and especially in a manner that provides securement of both tires nearly simultaneously.

Certain embodiments of the present invention are directed to a bicycle carrier for a vehicle having at least one pivoting wheel anchor for securing a bicycle wheel, preferably shaped as an arched tire loop or a tire hook device (such as Kuat™ pivoting tire retaining mechanism), preferably configured to accept bicycle wheels of different sizes, and thus, preferably including a telescoping mechanism that can be adjusted to address the different sizes of tires of bicycles on the carrier. The carrier preferably includes a tire receiving body having a bottom surface configured to be secured to the roof of a vehicle or to a roof rack connected to a vehicle. The tire receiving body, for example, may have a top surface having a tire receiving recess therein, such tire recess having a length, a bottom, opposing sides, and an opening for receiving a tire therein. A tire receiving body may be, for example, a V-shaped extension that accommodates the tires of a bike can be used, as well as separate tire conforming members that are connected to a roof rack of a vehicle, with both of such designs providing a tire retaining recess to enable one to at least position a bike onto the carrier. A rotatable member for rotating relative to the tire receiving body is provided that moves (e.g. rotates) from an open position, which provides tire access to operably position the tire within the tire receiving recess, to a closed position, wherein at least one arm associated with the rotatable member inhibits the tire from moving vertically out of the tire recess. While various different designs are contemplated and encompasses by the present invention, as one of skill in the art will appreciate with the description and guidance herein provided, certain preferred embodiments employ a rotating tire-enclosing feature that has a first portion of a rotatable member that is secured within a recess of a body in a manner that permits it to rotate between the above referenced open and closed positions, thus permitting one to reversibly attach and detach a bicycle from a vehicle mounted carrier. Preferably the rotatable member includes two opposed tire retaining arms that move from an open position, wherein the tire retaining arms provide tire access for positioning the tire within the tire recess, and a closed position, wherein the tire retaining arms inhibit the tire from moving vertically out of the tire recess. In other words, when the retaining arms are in an open position, the tire retaining arms offer no obstruction to a tire as one positions the tire on the carrier so that the tire is placed into the tire recess. Preferably, the rotatable member has an axis of rotation that extends directly below and perpendicular to a longitudinal axis of the tire when the tire is positioned within the tire retaining recess. While the "galaxy clamp" design as featured in the figures and as described in the specification can be employed so as to replace traditional straps used to secure bike tires or wheels to a vehicle or carrier, in preferred embodiments of the present invention at least one of the galaxy clamps is operably associated with either a pulley or rotating bar mechanism or push/pull mechanism so that movement of the galaxy clamp is associated with the movement of such a feature elsewhere positioned on the carrier, such as near the other bike tire of the bicycle, so that the pivotal movement of a tire arch/hoop/hook to secure one tire of the bicycle, acts to, for example, rotate a longitudinally extending bar; activate the pulley to cause such rotation of the clamp, and/or to reversibly push/pull the rotatable clamp into and out of closed and open positions. Such a bar is preferably operably associated with the galaxy clamp so that the movement of the galaxy clamp is between the open and closed positions depending upon the related position of the other tire retaining mechanism, preferably a front tire engaging loop. In such a manner, when a front tire arch/hoop is in a tire receiving position, the galaxy clamp at the other end of the carrier is in the open position. Conversely as the arch/hoop is pivotally moved to secure a front tire of a bike, the galaxy clamp is moved from an open to a closed position, such that the bike is secured by contact with structures on both tires/wheels, e.g. an arch/hoop on the front tire and a galaxy clamp on the back tire/wheel encircling the back tire and securing the tire to the carrier. This simple movement of a front engaging tire arch/loop is therefore able to secure a bike to a carrier without further steps required to ensure that the bike is properly loaded on and secured to the carrier. As stated, while a pulley system can be employed to associate the pivotal movement of the arch/loop and the rotational movement of the galaxy clamp, in certain embodiments a rotating bar is employed for the functional aspect of coordinating the pivotal movement and the rotational movement of the galaxy clamp. In one particular embodiment, a bar extends from and below the pivotable arch loop and to the tire receiving body at the other end of the carrier (e.g. near the back tire of the bike when positioned on the carrier) with the bar being associated with the pivotable arch loop and movable when the arch loop is pivoted. In preferred embodiments, the bar is moved in one of two ways: i) rotationally, such that one end of the bar causes a bevel gear assembly to turn the rotational member to reversibly engage a tire wheel; and ii) horizontally, such that the rotational member is reversibly moved from an engaged tire wheel position to an unengaged tire wheel position. This later movement can be characterized as a "push-pull" feature, but the result in preferred embodiments of the present invention is to achieve a coordinated movement between the pivotal front tire engaging arch/loop and the rotational movement of a tire engaging feature for the back tire of a bike positioned on the carrier. In such a fashion, the ability to secure a bike to a carrier by solely moving a front tire arch/loop, and by doing so, also moving a back tire retaining clamp so that it encircles the tire in a secure manner, is made possible, and forms a broad characterization of the novel and non-obvious aspect of the present invention.

Other embodiments are directed to a bicycle carrier for a vehicle that secures a bike with both front and back tires to the carrier, with the carrier having an arched tire loop configured to accept a front tire of a bike, with the arched tire loop pivotally mounted on a front portion of a bicycle carrier. The carrier further includes a front tire recess having a length, a bottom, opposing sides, and an opening for receiving a front tire therein. The front tire recess is positioned adjacent the arched tire loop. The carrier also has a back tire recess having a length, a bottom, opposing sides, and an opening for receiving a back tire therein, with such back tire recess associated with a rear portion of the carrier. A unique feature of certain embodiments is a rotatable member for rotating relative to the back tire recess, with the rotatable member movable from an open position, which provides access to operably position a tire within the tire receiving recess, to a closed position, where the rotatable member covers the opening of the back tire recess, and thus retains a bike tire placed therein. The rotatable member includes at least two opposed tire retaining arms that move between the open position and the closed position. The rotatable member has an axis of rotation that preferably extends directly below and perpendicular to a longitudinal axis of the back tire recess. A means for moving the rotatable member between the open and closed positions may include a pulley mechanism that is connected with the pivoting arched tire loop so that when pivoted, a cord is moved that pulls the rotatable member positioned at the rear tire recess, so that the rotating arms of the rotatable member reversibly cover and uncover the rear tire recess. Alternatively, such means for moving may include a bar extending from the arched tire loop and to the back tire recess, with the bar being associated with the arched loop such that when the arched tire loop is pivoted, the bar rotates and turns the rotatable member from the open position to the closed position. One will appreciate that this Summary of the Invention is not intended to be all encompassing and that the scope of the invention nor its various embodiments, let alone the most important ones, are necessarily encompassed by the above description. One of skill in the art will appreciate that the entire disclosure, as well as the incorporated references, pictures, etc. will provide a basis for the scope of the present invention as it may be claimed now and in future applications. While embodiments of the invention have been illustrated and described, it is not intended that these embodiments illustrate and describe all possible forms of the invention. Rather, the words used in this specification are words of description rather than limitation, and it is understood that various changes may be made without departing from the spirit and scope of the invention.

DETAILED DESCRIPTION OF THE INVENTION

Figure 1:
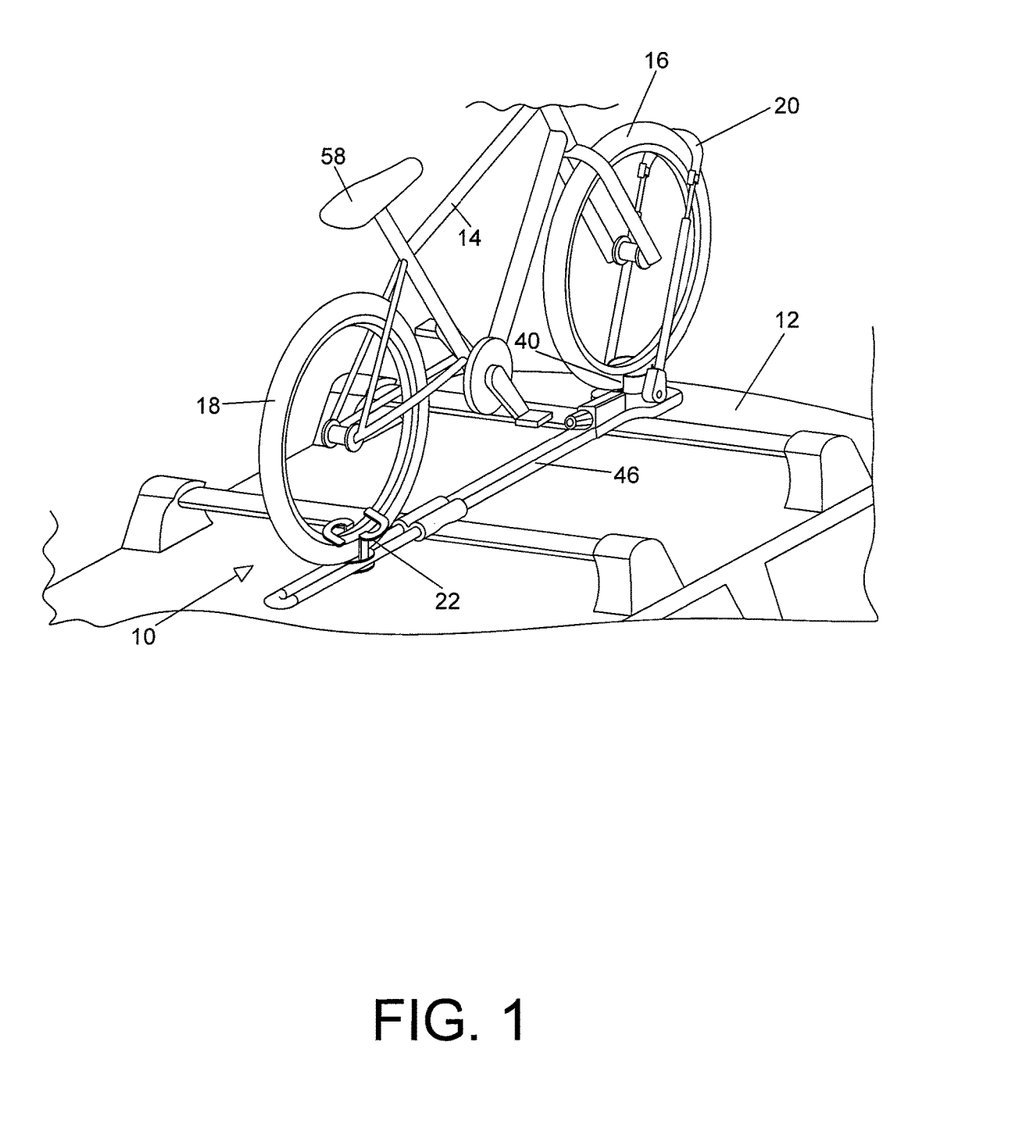
FIG. 1 is an isometric view showing a ride ready vehicle-mounted bicycle carrier constructed according to the invention.
Figure 2A:
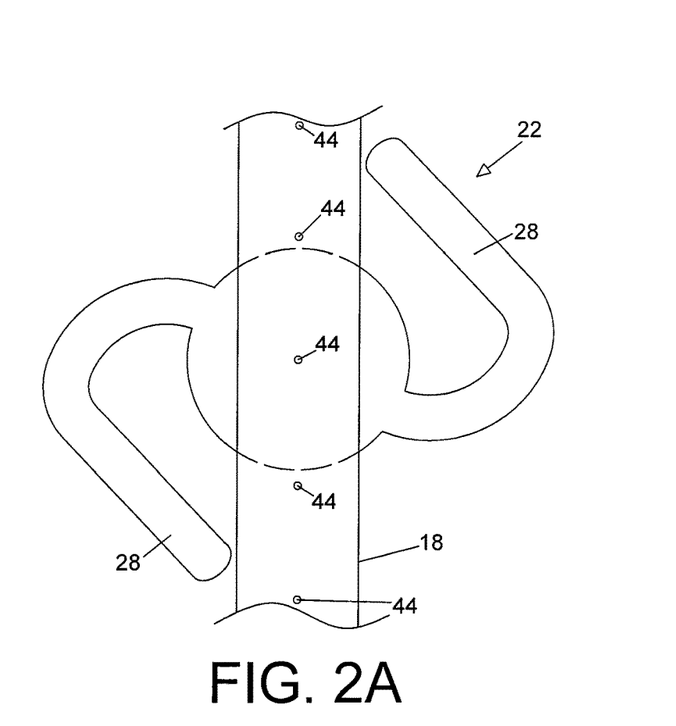
FIG. 2A is a top view of a galaxy clamp of the present invention showing the clamp in the open position (tire accepting).
Figure 2B:
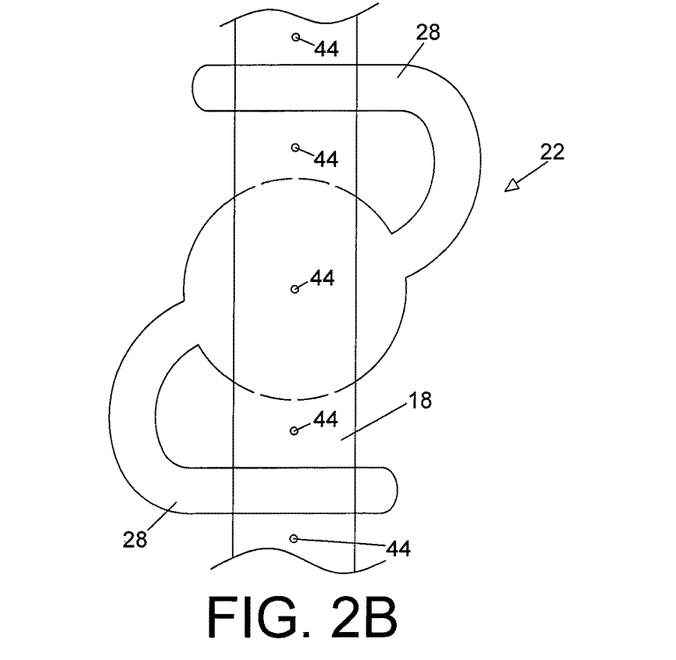
FIG. 2B is a top view of a galaxy clamp of the present invention showing the clamp in the closed position (tire entraining).
Figure 3:
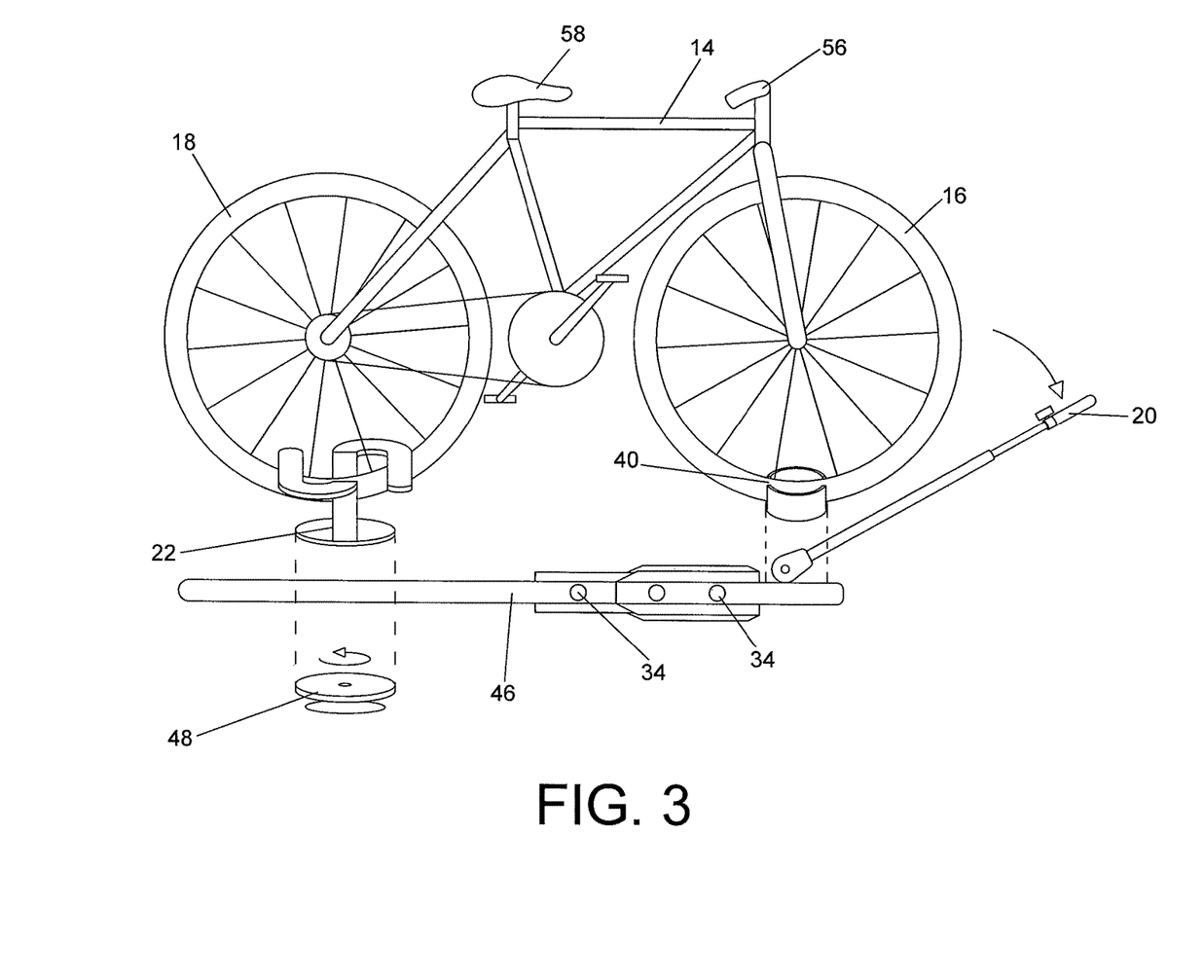
FIG. 3 is a side view of a bike just prior to being positioned in a bike rack, with the front tire engaging loop in an accepting position and the rear galaxy clamp in an accepting position.
Figure 4:
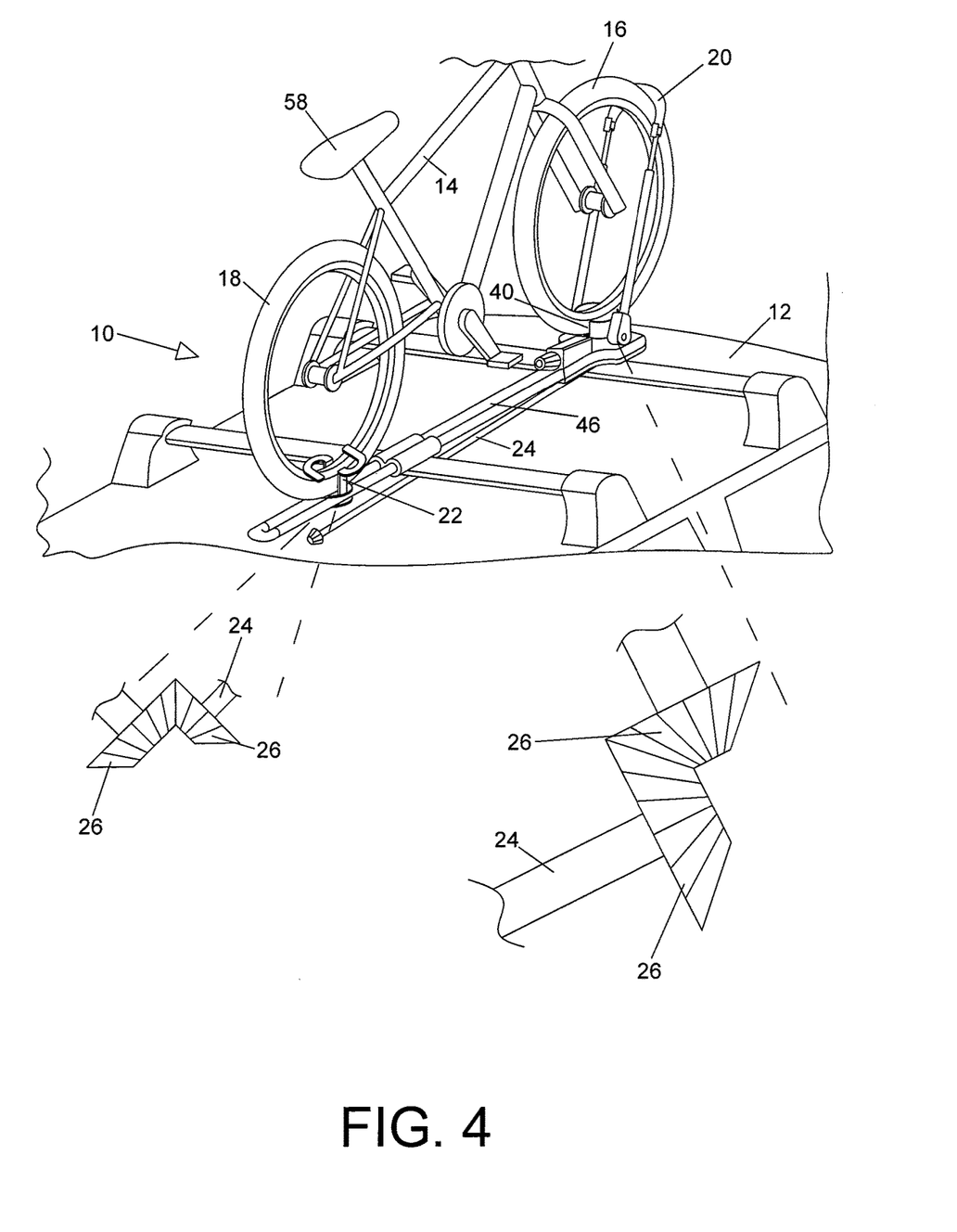
FIG. 4 is an embodiment of the bike carrier that employs gears to transfer rotation of the loop arm into movement of a rear tire engaging clamp.
Figure 5:
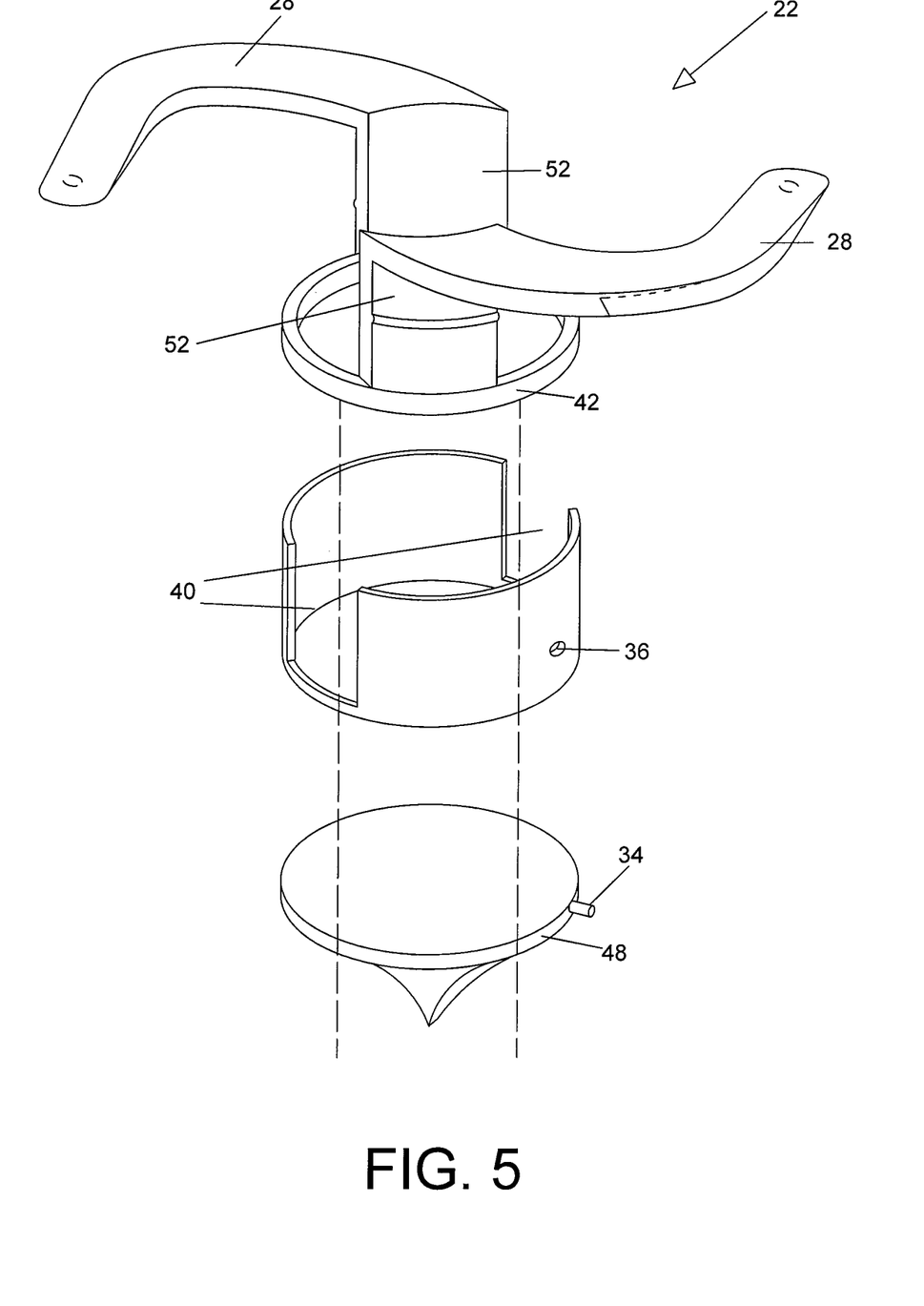
FIG. 5 is an exploded view of one embodiment off a galaxy clamp that employs a finger turning mechanism to rotate the galaxy arms between a closed and open position, with a push pin feature to lock the clamp at a pre-determined position.

FIG. 1 illustrates a bicycle 14 rack or carrier 10 adapted for mounting to a vehicle 12, preferably the roof of the vehicle, for transporting a bicycle 14. Bicycle 14 carrier 10 is adapted to carry a bicycle 14 in a ride-ready fashion, and provides quick and easy mounting of the bicycle 14 to the carrier and removal of bicycle 14 from the carrier. As explained herein, in one embodiment the carrier engages the front and rear wheels of bicycle 14 for retaining bicycle 14 in position on carrier 10, with the front wheel 16 being reversibly encompassed by a loop arch 20 and with the rear wheel 18 being clamped by, in one embodiment, a galaxy clamp 22 as described herein. In still other embodiments the front wheel 16 is also encompassed by a galaxy clamp 22. Preferably, the engagement of the bike 14 by the carrier 10 is achieved by a single action of pivoting the loop arch 22, which either spins a bar 24 (located under the longitudinal axis of the bike) which turns gears 26 that are connected to one or more galaxy clamps 22 so that the rear wheel 18 (and in other embodiments, both the front 16 and the rear 18 wheels) are encompassed by the arms 28 of the galaxy clamp 22. In such a manner, the bike 14 is secured to a vehicle 12 with a simple, one step pivoting action, resulting in both tire wheels 16, 18 being secured to the carrier 10. In preferred embodiments, the bike rack carrier 10 is provided with at least one lock, such as affiliated with the pivotal mechanism such that a single lock affords the locking of the entire bike to the carrier. This eliminates the need for more than one lock to be employed. The figures herein depict various ways in which the pivoting action of the arch loop 22 can cause the reversible engagement and disengagement of the rear wheel 18 (and in some embodiments, also the front wheel 16) by the use of gears 26 that effectively convey the pivotal movement to either a rotating movement of an underlying bar member 24, or to a horizontal movement that, in a push/pull fashion can move clamp arms 28 between clamping 30 and un-clamping positions 32. Push pins 34 can be employed in association with predetermined apertures 36 in the horizontally moveable member so that when the clamp 22 engages the rear wheel 18, the push pin 34 mechanism finds an aperture 36 that is moved into an engagement position, such that the bar 24 horizontal movement is thereafter ceased.

In various embodiments, the carrier 10 may include an axial central support member 46 that extends such that both the front 16 and rear wheels/tires 18 of a bike 14 can contact the carrier 10, and preferably the bike tire engaging recesses 40 are deep enough and configured in such a way that the bike 14 is relatively steady when placed in the two recesses 40: one for the front wheel 16 and one for the rear wheel 18.

The bike attachment mechanism includes a tire arch supporting member 20 that is pivotally connected to the carrier 10 so as to move into and out of engagement with a bike tire 16, 18. Thus, in an extended position, the arch support 20 provides room for a bike 14 to be placed into the tire recess supports 40 that are positioned on the carrier 10 to facilitate the provision of a bike 14 on the roof of the vehicle 12 in a somewhat stable orientation. The arch tire support 20 is connected for movement between a bike-loading extended position and a bike carrying position in which the arch tire support member 20 is positioned in an upright orientation. At least the other tire 18 is reversibly restrained in the carrier 10 via a closure or clamping mechanism 22 that is preferably operably associated with the movement of the arch support member 20. In a preferred embodiment, a rotating element 48, with either one or two arms 28, is employed to effectively entrap the tire/wheel 16, 18 so as to secure the tire to the carrier. The rotation of the tire clamping mechanism 22 is preferably achieved in concert with the movement of the arch support member 20, such that the pivotal movement of the arch support 20 moves a transverse extending bar member 24 along a longitudinal axis of the vehicle 12 (e.g. along an axis from the front of the car 12 to the back). The bar member 24 is operably connected to the rotating tire clamp mechanism 20, such as by a gear mechanism 26 or a pulley mechanism, such that the rotating clamping mechanism 22 moves from an open, tire accepting position 32 to a closed, tire retaining position 30. The arch support member's 20 contact with the other tire 18 is achieved at the same time that the other tire 18 is enclosed within the tire clamping mechanism 22 of the other tire 18.

With respect to at least the other tire retaining mechanism (although in certain embodiments such a tire retaining mechanism can be employed for both tires, as elsewhere described herein) a rotating-arm tire engaging system is used. In essence, a bike is placed in a roof mounted rack of the present invention and with essentially one pivot movement of a front wheel arch, the front wheel of the bike is secured. The pivotable arch is also operably associated with a bar that is itself associated with a rotatable clamp that secures the rear tire.

In can be referred to as a "galaxy clamp" 22, due to its appearance of a spinning galaxy with curved arms 28, certain embodiments include a central circular portion 48 that has two extending, curved arms 28 that are configured so that upon rotation of the circular portion 48, the arms intersect the spokes 44 on a tire wheel 16, 18 of a bicycle 14 such that the tire 16, 18 is retained and secured by the arms 28 interlocking between the spokes 44, entrapping the tire 16, 18. Preferably, the bike tire 16, 18 is placed within a tire recess 40 within which the galaxy clamp 22 circular portion resides within, with the tire 16, 18 able to be placed in such recess 40 only when the galaxy arms 28 are rotated out of the way 32, such that the tire recess 40 is fully accessible for the entry and exit of the tire 16, 18 within the recess 40.

When the tire 16, 18 is placed into the tire recess 40, the galaxy clamp 22 can be rotated so that the arms 28 are rotatably moved to a position above the tire 16, 18 and wherein the arms 28 intersect spokes 44 of the tire 16, 18. As most spokes 44 of tires 16, 18 are spaced approximately 2 inches apart, in preferred embodiments the galaxy arms 28 are configured so that when they are rotated so as to entrap a tire 16, 18 within the tire recess 40, the arms 28 span three spokes 44 between the arms 28. This results in the tire 16, 18 being held in the tire recess 40 with the arms 28 overlapping the top of the wheel section of the tire 16, 18 just above, if not in contact with the rim of the tire 16, 18, between the spokes 44. Approximately 4 to 8 inches of the tire rim is therefore clamped by the galaxy clamp arms 28, thus providing a stable and secure tire retention mechanism for the bike tire 16, 18, facilitating the tire 16, 18 being unable to be removed from the tire recess 40 while the galaxy clamp arms 28 are in a tire clamping position 30.

In some embodiments, only one galaxy clamp 22 is employed for either the front 16 or back tire 18, with the other tire 16, 18 being restrained by a hoop or arch structure 20 as described herein. In other embodiments, however, a galaxy clamp 22 is employed for each tire 16, 18, such that a bike 14 is restrained via both tires 16, 18 being reversibly maintained within tire recesses 40 and further entrained by rotating arms 28 of the front and rear galaxy clamps 22.

The particular geometries of the galaxy clamp 22 can be modified to suit particular tire 16, 18 and wheel designs. Thus, the particular shape and curve of the arms 28 can be adjusted and designed to suit particular tire 16, 18 and wheel designs. In preferred embodiments, the rotating galaxy clamp 22 is housed in a structure that has the following elements: a tire retention recess 40 that has side portions 42 that are adjacent to a tire 16, 18 when the tire 16, 18 is within the recess 40. Such side portions can have relatively flat walls and thus run essentially vertically parallel to the outermost portion of a tire 16, 18, or can be curved (so as to more easily conform to the rotating galaxy portions as described herein, and in such circumstances, the edges of the tire recess 40 are the only portions that contact the width of a tire 16, 18 when placed in the tire recess 40. In other configurations, the housing for the galaxy clamp 22 has a longer gap formed by relatively parallel walls 42 that run adjacent the walls of a tire 16, 18 when placed into the tire recess 40, with a central portion of the gap having a round (although in other configurations a cam shape) aperture provided that accepts the galaxy arm unit 28 as described herein. An example of one embodiment is pictured in several figures, showing a portion of the galaxy clamp 22 that provides for a tire recess 40 with parallel walls 52, a central portion 38 with a round aperture (within which the rotating arm portion 48 of the galaxy clamp 22 is positioned).

In some embodiments, the arms 28 are designed so as to rotate in a circular plane that is essentially parallel to the plane of the roof of a car 12 to which the bike rack system 10 herein described is mounted. In other embodiments, however, the angle of the arms 28 is angled out of such a plane in a manner that the interstitial, between-the-spokes 44, reversible engagement of the rotatable arms 28 with a bike tire 16, 18 is such that the angled portions of the arms 28 are brought into contact with portions of a tire rim, between the spokes 44, with the arm angle being such that the end of the arm points at an upward angle of between about 10 to 60 degrees, more preferably between about 20 and 55 degrees, and most preferably between about 30 and 45 degrees. The angling of the arms gives the galaxy clamp 22 the appearance of a fountain, with the arms reaching up and then being rotated between bike wheel spokes 44, with the lower portion of such arms 28 contacting the metal portion of a bike rim, thus "clamping" each respective side of the bike wheel 16, 18 rim by the opposed slanted arms of the galaxy clamp 22.

The particular sizes of the rotating members 48, the length and particular configuration of the arms 28, the number of arms 28, the angle of the arms 28 as they relate to the tire 16, 18, the depth of the tire recess 40, the radius of the rotating element 48 of the galaxy clamp 22 portion, the width of the arms 28, the number of the arms 28, as well as various other parameters, will be understood by one of skill in the art to be variable to accommodate different situations, without departing from the basic tenets of the present invention.

Provision of one or more galaxy clamp 22 housing structures on a bike rack 10 can be accomplished in various ways. For example, in one embodiment, a typical U-shaped or V-shaped recess elongated member 46 is provided that has a length to accommodate both tires 16, 18 of a bike 14 resting therein when a bike is positioned in such recess. Preferably the bike tires are entrained within such recess in a fashion such that there is at least a minimal amount of stability of the bike once in such recess so that the bike 14 stands vertically upright when placed in such tire recess 40. On at least one of the areas where one of the tires 16, 18 contacts the elongated member 46, a galaxy clamp 22 housing is positioned, with such housing being securely associated with the elongated member 46 at such position, such as being riveted, welded, attached via adhesives, screws, etc. to the elongated member 46. In preferred embodiments, the galaxy clamp 22 is provided in such a V-shaped or U-shaped recess elongated member 46 at a factory, but in other embodiments, the galaxy clamp 22 can be retrofitted to existing bike rack designs.

While preferred embodiments of the present invention anticipate the provision of a fully functional bike rack that includes at least one galaxy clamp 22 as described herein, in other embodiments, the galaxy clamp 22 itself, without the elongated members 46, horizontally movable bars that move the galaxy clamp 22 to rotate into/out of engagement with a tire 16, 18, etc. are provided such that an existing bike rack owner can retrofit their bike racks by, e.g. supplanting or adding one or more galaxy clamps 22 to their existing bike racks in places where they have conventional strap systems designed to secure tires to the bike rack. In other words, the galaxy clamp 22 is seen as a structural and functional replacement for such conventional strap securement devices and is believed to be superior to such conventional clamps for various reasons. These include the fact that the galaxy clamp 22 avoids the need to hook together a strap with a mating strap securing element. Conventional straps must be detached to use them each time. Moreover, such straps can be cut, damaged, warped, etc. in a fashion that precludes the proper functioning of the strap/closure system. Similarly, a strap securing mechanism can be worn down, engaging teeth broken or disabled, such that confidence in the strap being sufficiently engaged by the strap closure mechanism is lost by the bike owner. Dirt, mud, and other factors that can interfere with desired secure strapping of a bike to a vehicle, such elements are often encountered, especially in the case of off-road biking, mountain biking, etc. This complicates the situations encountered when a bike owner desires assurances that the securement mechanism of his/her bike rack is functioning. The galaxy clamp 22 of the present invention provides ready assurances in this respect due partly to the straightforward design of the rotating arms 28, which do not require any type of toothed engagement as is common with conventional strap systems. The ability to avoid the often troublesome threading of straps into a strap securing mechanism is achieved by use of the galaxy clamp 22 because all that is required to achieve the securement of a tire wheel 1, 18 in a galaxy clamp 22 is the proper rotation of the arms 28 after the tire 16, 18 is positioned properly in the tire recess of the galaxy clamp 22.

In certain other embodiments, only one arm 28 is employed on a galaxy clamp 22 as in some situations, only one rotatable arm 28 is necessary to sufficiently confine a bike tire to or within a bike tire retaining recess 40. At minimum, a single rotating arm 28 may be employed to preclude the tire 16, 18 from being removed from such recess 40 after the rotating arm over laps the upper surface of a tire wheel rim. Therefore, a "one arm" version of the galaxy clamp 22 may be employed as the rotation into and out of engagement with a wheel is, in various embodiments, sufficient to secure the bike 14 to the carrier 10. Thus, while two arms 28 (or more) are preferred, so that both sides of a wheel are encompassed by the arms of the galaxy clamp 22, a single arm would in many embodiments be sufficient to secure the bike 14 in an upright position. The use of one arm 28 has certain advantages as well as potential disadvantages. With one arm 28 it is easier to ensure that the galaxy clamp 22 can be rotated in between spokes 44 of the tire wheel 16, 18. With two arms 28, there is a greater possibility that one of the arms 28 may contact with a spoke 44, and thus make rotating of the galaxy clamp 22 more difficult. The lack of steric hindrance in this respect makes a single arm rotating closure system attractive. But having two opposed arms that entrain the tire wheel on both sides of the tire wheel provides increased and enhanced security that the wheel is retained in the tire recess, as well as more firmly securing the tire wheel in a substantially vertical position, thus enhancing the ability of a bike owner to avoid undesired movement of the bike during transport thereof. The inclusion of two arms also provides an extra guarantee that if one arm breaks, the other arm will nonetheless be sufficient to restrain the tire within the recess. This is also an advantage over conventional strap systems where a single strap is typically used to secure a tire in a tire rack and the breakage or unintended release of such strap due to a faulty securing mechanism, etc. can result in the bike being detached from the moving vehicle 12 transporting such bike.

The use of still other clamping mechanisms, especially those that contact both sides of the tire 16, 18, are included in the present invention. Preferably such clamping mechanisms function like a vice and are operatively connected to a rotating bar 24 that is rotated by the angular movement of a front tire arch 20, such clamping mechanism having an open (tire accepting) orientation and a closed (tire clamping) orientation. The arched, elliptical loop 20 is configured to be pivotally moved from a downward (tire receiving orientation) and a substantially up right tire restraining orientation). The tire clamping orientation of one end of the bar 24 thus matches the tire restraining orientation of the other end of the bar 24 (e.g. the one with the arched loop 20 at such end)—so that a bike owner may position their bike 14 in the bike carrier 10 and simply pivot the arch loop 20 to restrain one tire 16, 18, while the other tire 16, 18 is simultaneously gripped by the clamping jaw mechanisms on the other end of the carrier 10. The transfer of the pivotal movement to a rotational movement at the other end of the carrier can be accomplished in various ways, as will be understood by one of skill in the art. For example, a simple threaded screw arrangement whereby the movement of the arched loop 20 in a pivotal way, causes an associated underlying threaded bar 24 to rotate as the arched loop 20 progresses from an open to a closed tire engaging orientation (e.g. up-right position), so that the pivotal movement is conveyed to the bar in a rotational fashion. This rotational movement of the bar 24, at its other end, is then employed to move adjacent and cooperating opposing jaws in a fashion that moves them in a reversible manner, between a closed/clamping orientation 30, and an open, un-clamped orientation 32. This particular embodiment is effective when the clamping members are gripping the outer sidewalls of the tire 16, 18, but in certain circumstances may also grip the wheel itself. Some bike owners may object to the employment of any clamping of their bike wheels as it may cause such wheels to be dented or compressed, thus causing some injury to the wheels. The galaxy clamp 22 as described herein avoids such an issue by its ability to restrain the tire/wheel 16, 18 in a clamped position without exertion of side-tire compressive forces that could damage the wheel.

As one of skill in the art will appreciate, however, still other embodiments employ a tooth-like jaw structure that can accommodate the spoke 44 wheel configurations presented, such that when a toothed opposing jaw clamping mechanism is employed, the teeth can grip opposing teeth on another jaw by being configured to span the width of the tire/wheel, (preferably with each jaw spanning half the distance) and such jaws further being designed so as to accommodate the vertically extending spokes 44. In such an arrangement, the employment of a restraining opposing jaw structure is connected to and functionally operative with a levered, arch tire loop 20 system.

One of skill in the art will further appreciate other ways in which to correlate and coordinate the leverage of the pivotal movement of a tire loop 20 restraining feature and the reversible clamping of the other tire 16, 18 by translating the pivotal motion to the opposite end of a bike carrier bar 24 or rod. For example, instead of the threaded functional and structural components, e.g., bevel gears 26, the movement of a bar 24 in a horizontal direction can be employed to push or pull levers that can then cause jaws to either open or close.

Indeed, in one embodiment, instead of the employment of a spring biased pulley mechanism to cause the galaxy clamp 22 to rotate into either a tire engaging position 30 or a tire disengaging position 32, a similar threaded bar 24 arrangement as described herein can be employed to cause the rotation of the galaxy clamp 22 between a tire restraining orientation 30 and a tire accepting orientation 32. Such embodiments include the rotation of a bar 24 to compel two structures to reversibly collapse and clamp a tire 16, 18.

Various figures depict and disclose a rotatable member 48 which, when operably provided in the tire retainer slot 40, resides in the cylindrical recess 50 so that the rotatable member 48 is able to rotate about the central axis of the cylindrical recess 50 as described hereinbelow. The rotatable member 48 has a cylindrical portion attached to opposing columns 52 extending at right angles to the cylindrical portion 50. Each of the opposing columns 52 includes an interior column side. Attached to each opposing column is a curved tire retaining tire recess arm (also referred to as merely an "arm"). Each tire recess coverable extension arm has a free end and an underside. The opposing columns have an outer curved surface shaped to fit the contour of the circular wall of the cylindrical recess. Preferably, each of the curved surfaces contains a circular groove to retain the rotating arm structure. The cylindrical portion need not be necessarily cylindrical or circular. Indeed, the cylindrical portion can have various shapes (e.g., hexagonal, octagonal, etc.) as long as it is able to rotate within the cylindrical recess 50 about the central axis of this recess.

Preferably, the galaxy clamp 22 has a cylindrical recess 50 with curved walls and a circular protruding ring which seats into a circular groove of the rotatable member 48. In particular embodiments, a circular protruding ring and a circular groove mate together for allowing the rotatable member 48 to be secured in the cylindrical recess and still rotate about the axis. A rotatable member 48 is inserted in the cylindrical recess 50 of the tire retainer body, and the cylindrical portion 50 is seated against the circular floor. When the rotatable member 48 is operably coupled to the tire retainer body, one of the tire recess coverable extension arms 28 is positioned on each of the left side and right side of the front surface of the tire retainer body. The interior column 52 is shaped and sized to sufficiently align with the tire recess side walls for allowing a tire to be received within the tire recess 40. A rotatable member 48 sits within the tire retainer body 40 such that the rotatable member 48 in the open position has curved tire retaining extension and in this open position a tire 16, 18 may be inserted and removed from the tire recess 40.

The configuration of the rotatable member 48 referred to herein as being in a "closed position" is the orientation of the clamp 22 when the arm extensions 28 are spanning the tire recess 40. The opposing interior column 52 sides allow a tire to reside therebetween in the tire recess 40.

In various embodiments, a resilient component (e.g. a spring or other elastomeric member) may bias the tire retaining arms 28 in the closed position and be configured so that when a rotational force is applied to the rotatable member it can open the arms 28 to reveal the tire retaining slot, thus permitting removal or placement of bike tires 16, 18 therein. In other embodiments, the movement of the galaxy clamp 22 is more simply reversibly operated by having a "push-pull" type mechanism such that an underlying bar 24 that is moved by the pivoting action of a front tire 16 encompassing arch member 20, pushes (or pulls) against a surface underlying the clamp, thus forcing the clamp 22 between an open 32 and an closed orientation 30.

In particular embodiments, the arms 28 of the galaxy bracket 22 are adjustable or reversibly exchangeable such that different sized bike tires 16, 18 and wheels can be accommodated. Thus, in certain embodiments, the curved arm portions 28 are fitted onto the rotating column 48 structure in a manner that permits one to select particular configurations such that the arms 28, when rotated, snuggly fit over the wheel rim portions of a tire 16, 18 of a bike 14 intended to be retrained in the bike rack 10. One of skill in the art will appreciate the various ways such a reversible but secure fitting of arms 28 onto the base column 52 structure can be accomplished, including the use of push-pin 34 structures used in conjunction with apertures 36; snap-fit connections, telescoping nested connections, etc.

In still other embodiments, the bike 14 is restrained not via the bike tires 16, 18, but by the opposite side of the bike 14 when it is inverted for travel and transport. Bicycle 14 may be attached to a vehicle 12 roof-rack through their frames or their wheels. Certain bicycle 14 carriers that are designed to attach the wheels to the vehicle 12 roof-rack, often are not stable enough and some bicycle carriers require disassembly of one or both wheels and as a result, using such systems, it may be difficult for one person to position and balance a bicycle 14 on the carrier as the bicycle 14 is attached. There is therefore a need for a bicycle 14 mount that securely attaches a bicycle 14 to a vehicle 12 roof-rack and which enables quick mounting and quick releasing of the bicycle 14, with no need for assembly of parts of the bicycle 14. The present invention, in its various embodiments, provides for a ready-to-ride bicycle carrier, enabling one person to mount or dismount a bicycle 14 onto or from a vehicle 12 roof-rack. Certain embodiments are directed to a system that provides a bike rack that secures a bike in an up-side-down position that secure the handle bars 56 and the seat 58 to the vehicle 12 rack. In one embodiment, the bicycle 14 carrier includes one (and more preferably two) handlebar holder(s) and a bicycle 14 seat 58 holder. The bicycle 14 carrier of the present invention thus includes preferably two bicycle handlebar holders 56 and a seat 58 holder that employ the galaxy clamp 22 as described herein.

In other embodiments, particularly related to reversibly attaching items that are planar in nature, such as skis and snowboards, the employment of a modified galaxy clamp is used to secure such items, especially in situations where a vehicle 12 is without an existing factory installed roof rack. A galaxy clamp can therefore be provided on a vehicle, so as to secure such planar items in a fashion in a unique way.

While the galaxy clamp 22 may be made from various materials, preferably light weight but sturdy material is preferred, such as ABS or another thermoplastic and thermoset material that have characteristics similar to ABS such as polypropylene, high-strength polycarbonates, and/or blended plastics, may be used instead of ABS.

Figure 6:
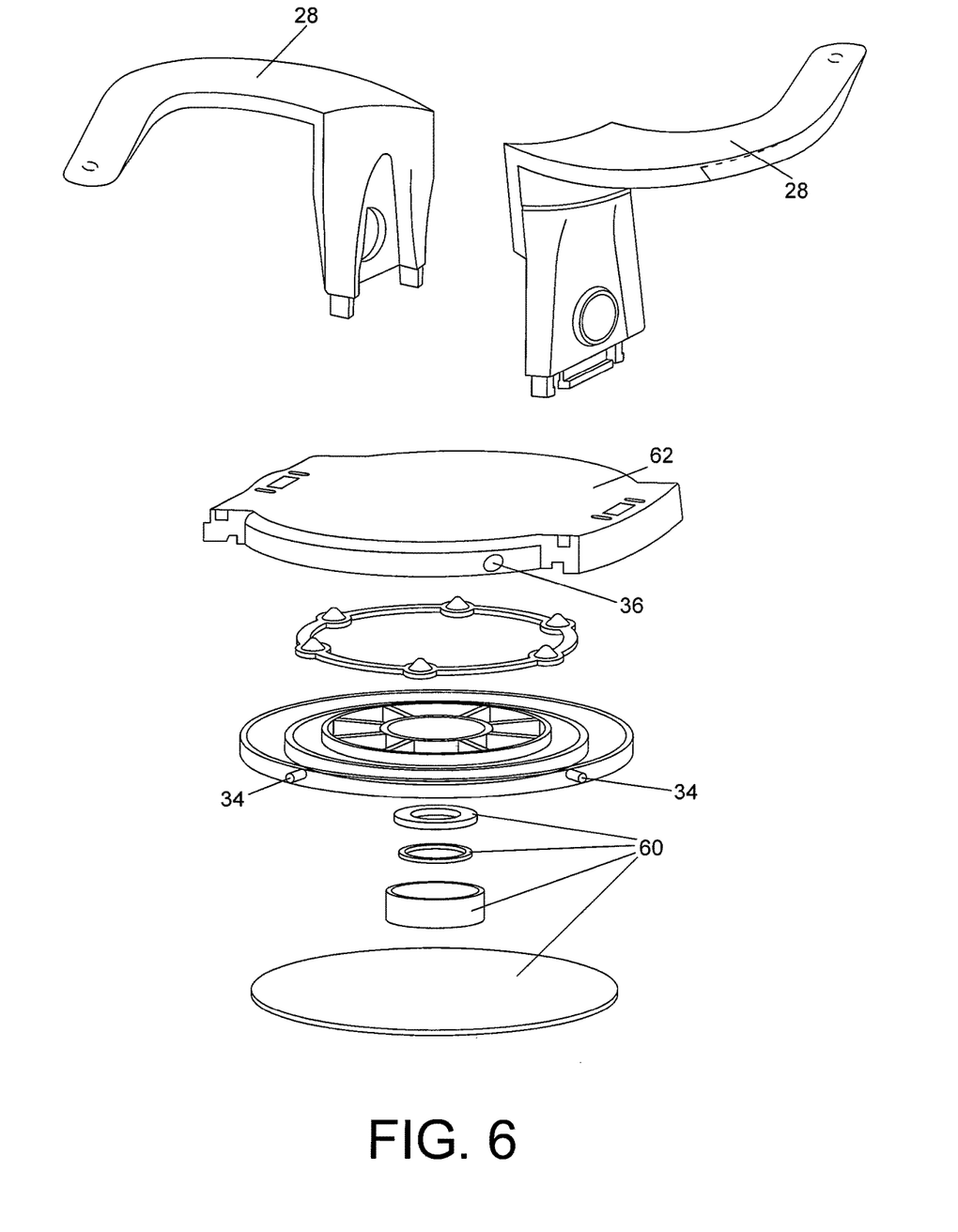
FIG. 6 is an exploded view of one embodiment of a galaxy clamp suitable for retaining a snowboard, showing the rotating turn table mechanism.

The galaxy clamp 22, in one embodiment, is especially configured for transporting a snowboard, and includes a Lazy Susan-like 60 component that permits the clamp arms 28 to rotate, with steel or hard plastic ball-bearings being used to facilitate rotation of the clamp 22 between engaging 30 and disengaging 32 positions. Thus, a turntable 62 to allow rotation of movement of the galaxy clamp 22 to facilitate reversible engagement of skis, snowboards, etc. is provided, but without the need for a separate factory installed roof racking system. Instead, the galaxy clamp 22 can be attached, e.g. via and adhesive or by being strapped onto the roof of a vehicle 12 using straps extending from and connected to the galaxy clamp 22 on each side thereof, with the other ends of the straps being connected to the roof/door-closing regions.

To comply with written description and enablement requirements, the following are incorporated by reference in their entireties such that one of skill in the art will appreciate the various components involved and how such prior art systems can be modified in accordance with and in view of the guidance provided by the present specification: U.S. Pat. No. 7,222,763 and U.S. Pat. No. 6,761,297 to Pedrini; U.S. Pat. No. 6,601,712 to Dean et al; U.S. Pat. No. 8,961,172 to Dupray; 2011/0123942 to Rudman et al.; U.S. Pat. No. 8,496,148 to Farney et al; and 20150026935 to Prescott.

With respect to the various so-called galaxy clamp 22 embodiments, the columns 52 should preferably have a width that is less than about ⅓ of a semi-circular section of the otherwise circular aperture into which the galaxy clamp 22 winged arm structure rotates. The narrowness of the column 52 thus permits the arms 28 associated with the clamp 22 to rotate between a position that in one position accepts a tire in a tire retaining recess 40 (prior to the tire being clamped) and a position where the tire 16, 18 is entrained by the clamp, with opposing arms being rotated over the top of the tire bead, over the wheel rim and in-between spokes 44 of the tire wheel. To permit adequate space for the rotation of the arms 28, the curved width of the column 52 is in proportion to the diameter of the circular recess within which the curved columns sit. If the column 52 is too wide, then the ability of the open arm position is limited, and thus maintaining the column 52 in a narrow configuration permits a wider range of motion, and thus, a larger space between the open arms 28 to accept a wider width of items to be enclosed therein. In particular embodiments, the column portion of the arm (i.e. the portion that extends vertically within the circular recess of the clamp device) is comprised of a relatively slender but strong and rigid member, with the remainder of the arm portion 28 (i.e. the arm that bends and that is in contact with the item to be encompassed by the clamp) being substantially wider, such that the above referenced slender portion within the circular recess of the galaxy device provides a maximum of space between the open arms 28, while the thicker width arms provide more surface area to contact with the items to be constrained by the clamp 22.

In certain embodiments of the present invention, the width of the column is less than about 90 degrees of the 180 degree semi-circular expanse of the round aperture that accepts the portion of the Galaxy clamp 22. In other embodiments, the column 52 is less than about 30 degrees of the 180 degree semi-circular expanse of the round aperture, thus permitting more room for the arms to rotate and to accept items having a larger width.

In other embodiments, the clamp 22 that secures the tire 16, 18 is adjustable such that different sized tires can be accommodated, such as by having compressible material on the jaws so that when pressed by the jaws against the tire, such material compresses to conform to the outer surfaces of the tire and yet holds the tire firmly within the clamp structure.

In still other embodiments, still focusing on a method and system that provides the desired ability to secure a bike 14 to a roof rack with limited, and preferably just a single basic movement, certain devices employ a vice type gripping mechanism to push against each side of a bike tire 16, 18 with opposing jaws that are brought reversibly together via the movement of a bar that traverses the horizontal axis of the car (and the horizontal axis of the bike when aligned therewith) such that such bar's movement in a horizontal direction, is translated into an approximately 90 degree movement of opposing jaws to grip a bike tire 16, 18 resting in a tire recess. The way in which the rod's horizontal movement is translated so as to move the gripping jaws against, and then away from, the tire can be accomplished in various ways, including the worm or beveled gear 26 mechanisms as featured in some figures. Spring and pulley systems may also be employed and one of skill in the art will appreciate the various different ways to achieve such translation of force from the pivoting movement of a front tire restraining arch 20, into either the rotational or horizontal movement of a bar 24 operably associated with the pivotal arch 20, such that the other tire is entrapped within either the galaxy clamp 22 or the vise-like clamping mechanism that employs two opposed tire-jaws to reversibly restrain the rear tire 18 in the bike carrier 10.

The front wheel 16 support arch member is preferably capable of receiving and engaging all sizes of bicycle 14 wheels, from the smallest juvenile bicycle 14 to the largest adult bicycle 14. A narrowed trough portion 40 is adapted to receive narrower bicycle tires such as are found on racing or street bicycle 14 *s*, and wide trough portion is adapted to receive wider bicycle 14 tires such as are found on juvenile and mountain bicycle 14.

While the present invention has been described in terms of a primary use as a method and system for securing a bike to a vehicle, other embodiments relate to the securement of other articles, such as sports equipments, etc. that one would also like to have secured to a vehicle 12 for transport and conveyance. For example, in one embodiment of the present invention, a galaxy clamp is configured to secure a snowboard. In such embodiment, the galaxy clamp 22 has a far broader base and the arms are sized so that in an open position, a snowboard can be laid flat on top of the clamp 22, and when the arms are then rotated, the snowboard is held between the arms in a closed position. In preferred embodiments, the arms 28 have a compressible foam layer that can compress against the surface of the snowboard when being rotated, thus maintaining the snowboard in a secure position when the clamp 28 is in a closed position 30. For example, closed cell foam arm-contacting sleeves can be provided to ensure that the snowboard is firmly retained on the vehicle 12 when the arms are in a closed position. While preferred embodiments of such a snowboard claims are provided with such sleeves as a integral component of the arms 28, in other embodiments, the sleeves can be reversibly slid onto the arms 28 such that when snowboards are stacked on top of each other, for example, the thickness of the sleeve can be selected to provide the desired level of compressible foam, all with the intent to secure the snowboards to the vehicle 12 without damage to the board, but in a manner that provides an owner thereof with the ability to simply rotate the galaxy clamp 22 mechanism to secure a snowboard, Preferably, two galaxy clamps 22 are employed to secure a snowboard, one employed and attached to the vehicle 12 (e.g. such as onto an existing car rail system) approximately ¼ to ⅓ from the respective tips of the length of the snowboard. Still other embodiments involve the use of a single galaxy clamp 22 that is configured for securement of a snowboard with a single rotating clamping mechanism. In one such embodiment, the arms 28 of the galaxy clamp 22 are preferably thicker in width and are configured with board contacting surfaces that ensure that the board, once within the galaxy clamp 22 in a closed position, is held securely and without danger of detaching from the vehicle. Typically, this is achieved with a galaxy rack system that is in a horizontal position in relation to the roof top of a vehicle 12, but it can be mounted in various other orientations. The arms 28 are preferably at least about 3 inches wide, more preferably about 4 inches wide, and have compressible or rotatable features, e.g. ball bearings, etc., such that the arms are able to rotate over the snowboard so that the board is secured in a snug relationship on the vehicle 12 (e.g. such that vehicle 12 speed and wind associated with the same will not cause the board to chatter or become detached from the car, but at the same time will cause no damage to the surface of the snowboard.

As one of skill in the art will appreciate, while bike 14 and snowboard securement has been described in some detail, other objects can similarly be secured to a vehicle 12 by employing the galaxy clamp 22 as described herein, and such methods and systems are therefore intended to be part of the present invention. For example, but in no terms limiting in this regard, one can employ appropriately configured galaxy clamps 22 for securing windsurfers, masts, surfboards, kayaks, skis, fishing equipment, etc. as well as compartments intended to be placed on the top of a vehicle 12 to itself contain a variety of items, such as luggage, etc.

In such later embodiment, galaxy clamps 22 can be employed to secure certain pre-defined "bars" on the bottom portion of such a carrier compartment such that several clamps 22 can be used that are accessible to a user by a twisting/turning mechanism on the bottom-most portion of the galaxy clamp, with such twisting/turning mechanism operatively connected to the rotating column structure so that the arms 28 can be reversibly positioned between open 32 and closed 30 positions. The galaxy clamps 22 themselves may be attached to an existing vehicle 12 rack by straps or other securement mechanisms.

One of skill in the art will appreciate that, from the guidance provide herein, it is straightforward to achieve adjustability of the devices as described to accommodate various different sized items to be carried on the carrier. For example, the arms of the galaxy clamp embodiments can be adjustable in various fashions, such as by making them telescoping or slidably associated with internal portions thereof, such that, for example, fat tire bikes can be accommodated. The width, length, sizes, etc. of various components as described herein can be not only selected for particular carrying purposes, e.g. to accommodate the dimensions of a snowboard or skis, but can further be rendered adjustable by well-known design features to custom fit the clamps as described herein for particular uses, items, bikes, etc.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention. Those skilled in the art will appreciate that the conception upon which this disclosure is based, may readily be utilized as a basis for designing of other structures, methods and systems for carrying out the several purposes of the present invention. It is important, therefore, that the claims be regarded as including any such equivalent construction insofar as they do not depart from the spirit and scope of the present invention.

What is claimed is:

1. A bicycle carrier for a vehicle, comprising:
 a pivoting wheel anchor for securing a bicycle wheel in an arched tire loop configured to accept bicycle wheels of different sizes;
 a tire receiving body having a bottom surface configured to be secured to the roof of a vehicle or to a roof rack connected to a vehicle, said tire receiving body having a top surface having a tire receiving recess therein, said tire recess having a length, a bottom, opposing sides, and an opening for receiving a tire therein,
 a rotatable member for rotating relative to the tire receiving body from an open position, which provides tire access to operably position the tire within the tire receiving recess, to a closed position, wherein at least one arm associated with said rotatable member inhibits the tire from moving vertically out of the tire recess;
 wherein a first portion of the rotatable member is secured within a recess of the body, and rotates therein when the rotatable member rotates between the open position and the closed position;
 wherein the rotatable member includes two opposed tire retaining arms that move from an open position, wherein the tire retaining arms provide tire access for positioning the tire within the tire recess, and a closed position, wherein the tire retaining arms inhibit the tire from moving vertically out of the tire recess, wherein when said retaining arms are in said open position, said tire retaining arms providing no obstruction to a tire from entering the tire recess, said rotatable member having an axis of rotation that extends from the bottom surface towards the axle of a tire when the tire is positioned within the tire retaining recess, the axis of rotation also being perpendicular to the rotational axis of the axle when the tire is positioned within the tire retaining recess;

a bar extending from and below the pivotable arch loop and to the tire receiving body, said bar being associated with the pivotable arch loop and movable when the arch loop is pivoted, said bar being moved in one of two ways: i) rotationally, such that one end of the bar causes a bevel gear to turn the rotational member to reversibly engage a tire wheel; and ii) horizontally, such that the rotational member is reversibly moved from an engaged tire wheel position to an unengaged tire wheel position.

2. A bicycle carrier for a vehicle that secures a bike with both front and back tires to the carrier, comprising: an arched tire loop configured to accept a front tire of a bike, said arched tire loop pivotally mounted on a front portion of a bicycle carrier; a front tire recess having a length, a bottom, opposing sides, and an opening for receiving a front tire therein, said front tire recess being adjacent the arched tire loop; a back tire recess having a length, a bottom, opposing sides, and an opening for receiving a back tire therein, said back tire recess associated with a rear portion of the carrier; at least one rotatable member for rotating relative to the back tire recess, said at least one rotatable member movable from an open position, which provides access to operably position a tire within the tire receiving recess, to a closed position, wherein the at least one rotatable member covers the opening of the back tire recess; wherein the at least one rotatable member includes at least two opposed tire retaining arms that move between said open position and said closed position, said at least one rotatable member having an axis of rotation that extends perpendicular to the longitudinal axis and from below the bottom of the recess upwards between the opposing sides; a bar extending from the arched tire loop and to the back tire recess, said bar being associated with the arched loop such that when the arched tire loop is pivoted, said bar is moved in one of two ways: i) rotationally, such that one end of the bar causes a bevel gear connected to the bar to turn the at least one rotatable member; and ii) horizontally along the longitudinal axis of the back tire recess, such that the at least one rotatable member is moved from the open position to the closed position.

3. A bicycle carrier for a vehicle that secures a bike with both front and back tires to the carrier, comprising: an arched tire loop configured to accept a front tire of a bike, said arched tire loop pivotally mounted on a front portion of a bicycle carrier; a front tire recess having a length, a bottom, opposing sides, and an opening for receiving a front tire therein, said front tire recess being adjacent the arched tire loop; a back tire recess having a length, a bottom, opposing sides, and an opening for receiving a back tire therein, said back tire recess associated with a rear portion of the carrier; a rotatable member for rotating relative to the back tire recess, said rotatable member movable from an open position, which provides access to operably position a tire within the tire receiving recess, to a closed position, wherein the rotatable member covers the opening of the back tire recess; wherein the rotatable member includes at least two opposed tire retaining arms that move between said open position and said closed position, said rotatable member having an axis of rotation that extends from the axle of a tire towards the bottom of the recess when the tire is positioned within the tire retaining recess, the axis of rotation also being perpendicular to the rotational axis of the axle when the tire is positioned within the tire retaining recess; a bar extending from the arched tire loop and to the back tire recess, said bar being associated with the arched loop such that when the arched tire loop is pivoted, said bar rotates and turns the rotatable member from the open position to the closed position.

4. The bicycle carrier as set forth in claim 1, wherein a single action of pivoting the pivoting wheel anchor spins the rotatable member to cause the bevel gear to turn the rotational member to reversibly engage a tire wheel.

5. The bicycle carrier as set forth in claim 1, further comprising a lock associated with the pivoting wheel anchor.

6. The bicycle carrier as set forth in claim 1, wherein said pivoting of the pivoting wheel anchor causes the reversible engagement and disengagement of a rear wheel of a bicycle positioned in said bicycle carrier.

7. The bicycle carrier as set forth in claim 1, further comprising an axial central support member extending such that both a front and a rear tire of a bike contact the bicycle carrier when a bicycle is positioned on the bicycle carrier.

8. The bicycle carrier as set forth in claim 1, wherein the tire retaining arms are spaced to provide tire access for positioning a tire within a tire recess when in the open position.

9. The bicycle carrier as set forth in claim 1, wherein the pivotable arch loop contacts a front tire at the same time that a rear tire of a bicycle positioned on the bicycle carrier is contacted by the tire retaining arms.

10. The bicycle carrier as set forth in claim 1, wherein the pivotable arch loop is operably associated with the bar extending from and below the pivotable arch loop such that the bar is rotated when the pivotable arch loop is pivoted.

11. The bicycle carrier as set forth in claim 1, said tire retaining arms comprise extending, curved arms configured so that upon rotation of the rotatable member, the tire retaining arms intersect between spokes on a tire wheel of a bicycle positioned on the bicycle carrier.

12. The bicycle carrier as set forth in claim 1, wherein the tire retaining arms span three spokes between the tire retaining arms when in the closed position.

13. The bicycle carrier as set forth in claim 1, said tire retaining arms intersect between the spokes on a tire wheel of a bicycle positioned on the bicycle carrier, such that the time wheel is retained and secured by the tire retaining arms entrapping the tire wheel.

14. The bicycle carrier as set forth in claim 1, wherein one of a shape and curve of the tire retaining arms is adjustable to suit a particular tire design.

15. The bicycle carrier as set forth in claim 1, wherein the opposing sides comprise flat walls.

16. The bicycle carrier as set forth in claim 1, the tire retaining arms rotate in a circular plane.

17. The bicycle carrier as set forth in claim 1, the tire retaining arms are angled at an upward angle of between about 10 to 60 degrees.

18. The bicycle carrier as set forth in claim 1, wherein the tire retaining arms are angled such that they contact a metal portion of a bike, rim when in the closed position.

19. The bicycle carrier as set forth in claim 1, wherein the tire retaining arms restrain a tire when in said closed position without exertion of side-tire compressive forces that could damage the wheel.

20. The bicycle carrier as set forth in claim 1, further comprising a resilient component selected form the group consisting of a spring and an elastomeric member, said resilient component biasing the tire retaining arms in the closed position.

\* \* \* \* \*